United States Patent
Sanz Ananos et al.

(10) Patent No.: US 10,399,271 B2
(45) Date of Patent: Sep. 3, 2019

(54) ALIGNING AN AGENT DISTRIBUTOR

(71) Applicant: Hewlett-Packard Development Company, L.P., Houston, TX (US)

(72) Inventors: Isabel Sanz Ananos, Barcelona (ES); Sergi Culubret, Barcelona (ES); Santiago Sanz Ananos, Barcelona (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 123 days.

(21) Appl. No.: 15/515,333

(22) PCT Filed: Oct. 3, 2014

(86) PCT No.: PCT/EP2014/071241
§ 371 (c)(1),
(2) Date: Mar. 29, 2017

(87) PCT Pub. No.: WO2016/050320
PCT Pub. Date: Apr. 7, 2016

(65) Prior Publication Data
US 2017/0210075 A1 Jul. 27, 2017

(51) Int. Cl.
*B29C 64/165* (2017.01)
*B33Y 10/00* (2015.01)
(Continued)

(52) U.S. Cl.
CPC .......... *B29C 64/165* (2017.08); *B29C 64/386* (2017.08); *B33Y 10/00* (2014.12);
(Continued)

(58) Field of Classification Search
CPC ......... B33Y 10/00; B33Y 30/00; B33Y 50/00; B33Y 70/00; B33Y 90/00; B29C 64/10;
(Continued)

(56) References Cited

U.S. PATENT DOCUMENTS

| 5,017,753 A | 5/1991 | Deckard |
| 6,492,651 B2 | 12/2002 | Kerekes |

(Continued)

FOREIGN PATENT DOCUMENTS

| EP | 1415791 | 5/2004 |
| EP | 1447226 | 8/2004 |

(Continued)

OTHER PUBLICATIONS

International Search Report and Written Opinion for International Application No. PCT/EP2014/071241 dated Jun. 1, 2015, 12 pages.

(Continued)

*Primary Examiner* — Anthony Calandra
*Assistant Examiner* — S. Behrooz Ghorishi
(74) *Attorney, Agent, or Firm* — HP Inc. Patent Department (57) ABSTRACT

A method of aligning an agent distributor in an apparatus for generating a three-dimensional object comprises selectively depositing an agent on a layer of build material to form a predetermined alignment pattern (211, 212, 311, 312), and detecting the alignment pattern (211, 212, 311, 312) from a height profile in a surface of the build material, and performing an alignment operation using the detected alignment pattern (211, 212, 311, 312). An alignment pattern (211, 212, 311, 312) may comprise, for example, a series of triangles which are scanned to determine misalignment.

11 Claims, 8 Drawing Sheets

(51) Int. Cl.
*B33Y 30/00* (2015.01)
*B33Y 50/02* (2015.01)
*B41J 25/00* (2006.01)
*B29C 64/386* (2017.01)
*B33Y 70/00* (2015.01)

(52) U.S. Cl.
CPC ............... *B33Y 30/00* (2014.12); *B33Y 50/02* (2014.12); *B41J 25/001* (2013.01); *B33Y 70/00* (2014.12); *G05B 2219/49023* (2013.01)

(58) Field of Classification Search
CPC ......... B29C 64/20; B29C 64/30; B29C 64/40; G05B 2219/49023
See application file for complete search history.

(56) References Cited

U.S. PATENT DOCUMENTS

| | | | |
|---|---|---|---|
| 7,867,302 | B2 | 1/2011 | Nevoret et al. |
| 2004/0085377 | A1* | 5/2004 | Nielsen ................ B33Y 30/00 347/19 |
| 2004/0160468 | A1* | 8/2004 | Kim .................... B41J 2/04505 347/12 |
| 2006/0061613 | A1 | 3/2006 | Fienup et al. |
| 2007/0241482 | A1 | 10/2007 | Giller et al. |
| 2013/0242317 | A1* | 9/2013 | Leavitt ................ B41J 29/393 358/1.8 |
| 2014/0162033 | A1* | 6/2014 | Giller .................. B29C 64/135 428/207 |

FOREIGN PATENT DOCUMENTS

| WO | WO-2013150505 | 10/2013 |
|---|---|---|
| WO | WO-2014061024 | 4/2014 |

OTHER PUBLICATIONS

Khoshnevis, B, et al, "SIS—A New SFF Method Based on Powder Sintering", 2002, 8pgs, http://utwired.engr.utexas.edu.

* cited by examiner

ALIGNING AN AGENT DISTRIBUTOR

Additive manufacturing systems that generate three-dimensional objects on a layer-by-layer basis have been proposed as a potentially convenient way to produce three-dimensional objects.

BRIEF DESCRIPTION OF THE DRAWINGS

For a better understanding of the examples described herein, and to show more clearly how the examples may be carried into effect, reference will now be made, by way of non-limiting example only, to the following drawings in which:

FIG. 2b shows a side view of the example of FIG. 2a;

FIG. 2c shows a perspective view of the example of FIG. 2a;

FIG. 2d shows further details of the example of FIG. 2a;

FIG. 3b shows a side view of the example of FIG. 3a;

FIG. 3c shows a perspective view of the example of FIG. 3a;

FIG. 3d shows further details of the example of FIG. 3a;

DETAILED DESCRIPTION

A process of generating a tangible three-dimension object may comprise a series of steps which include forming a layer of build material, selectively delivering an agent (for example a coalescing agent and/or a coalescence modifier agent) to one or more portions of a surface of the layer of build material, and temporarily applying a predetermined level of energy to the layer of build material. The temporary application of energy may cause portions of the build material on which coalescing agent has been delivered or has penetrated to heat up above the melting point of the build material and to coalesce. Upon cooling, the portions which have coalesced become solid and form part of the three-dimensional object being generated. These steps may then be repeated to form a three-dimensional object. Other steps and procedures may also be used with this series of steps.

An agent, for example a coalescing agent or coalescence modifier agent, can be deposited using an agent distributor, which deposits the agent on a build material. In the examples described herein a coalescing agent and coalescence modifier agent can comprise fluids that may be delivered using an agent distributor. In one example the agents are delivered in droplet form.

A coalescence modifier agent may be used for a variety of purposes. In one example, a coalescence modifier agent may be delivered adjacent to where coalescing agent is delivered, for example to help reduce the effects of lateral coalescence bleed. This may be used, for example, to improve the definition or accuracy of object edges or surfaces, and/or to reduce surface roughness. In another example, coalescence modifier agent may be delivered interspersed with coalescing agent, which may be used to enable object properties to be modified.

In the examples described herein references to a build material may include, for example, a build material that is a powder-based build material. As used herein, the term powder-based material is intended to encompass both dry and wet powder-based materials, particulate materials, and granular materials.

An agent distributor, according to an example described herein, may comprise a printhead or printheads, such as thermal printheads or piezoelectric printheads. In one example printheads such as suitable printheads used in commercially available inkjet printers may be used.

The examples described herein are related to a method and apparatus for aligning an agent distributor, for example aligning a printhead or multiple printheads.

Figure 1:
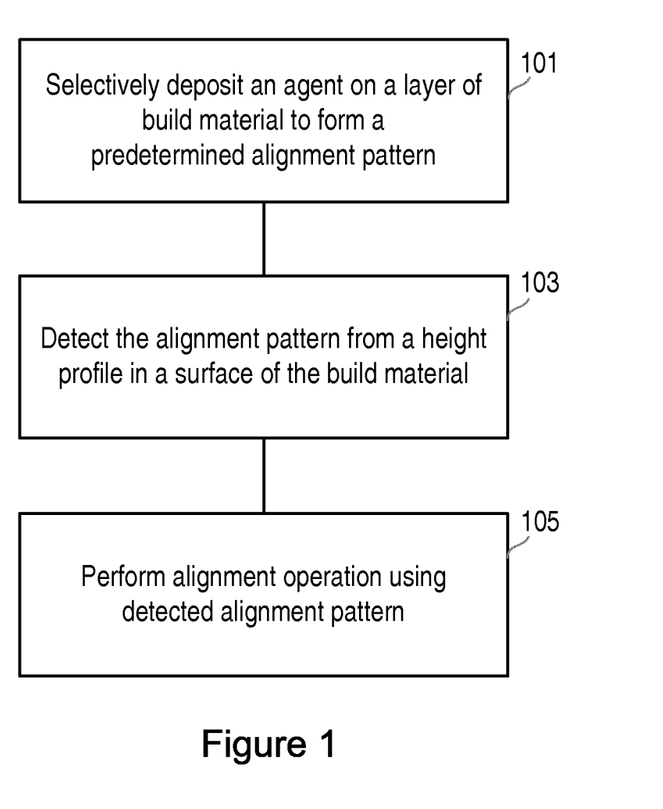
FIG. 1 shows an example of a method of aligning an agent distributor.

FIG. 1 shows an example of a method of aligning an agent distributor in an apparatus for generating a three-dimensional object. The method comprises selectively depositing an agent on a layer of build material to form a predetermined alignment pattern, 101. The alignment pattern is detected from a height profile in a surface of the build material, 103. An alignment operation is performed using the detected alignment pattern, 105. A height profile in a surface of a build material may comprise changes of height caused, for example, by interaction of the agent and the build material.

An example described herein takes advantage of a contraction or expansion that occurs when an agent interacts with a build material, for example as a result of being deposited on a portion of build material during a printing operation. For example, when a layer of build material has a coalescing agent selectively distributed thereon during a printing operation (and for example is heated), the printed area experiences a depression. The amount of depression or change, for example in a surface of a build material, may be dependent on the agent, the build material, or some other characteristic of the build process, and in one example may be in the region of about 50 microns. This contraction or change causes a height difference between portions on the build material on which an agent has been deposited, and portions of the build material on which no agent has been deposited. This height profile may be used by the examples described herein to detect an alignment pattern, which may then be used to perform an alignment operation in the apparatus, for example align an agent distributor, for example a printhead such as a thermal printhead.

In one example, detecting the alignment pattern comprises detecting a change in height in the surface of the build material at a plurality of reference points along a scan axis, wherein the plurality of reference points are used to compare the detected alignment pattern with the predetermined alignment pattern.

In one example, the predetermined alignment pattern comprises at least first and second reference lines that traverse a scan axis (X) of an agent distributor, the first and second reference lines having a known angular relationship with respect to each other. The first and second reference lines in one example are oblique to a scan axis.

Figure 2A:
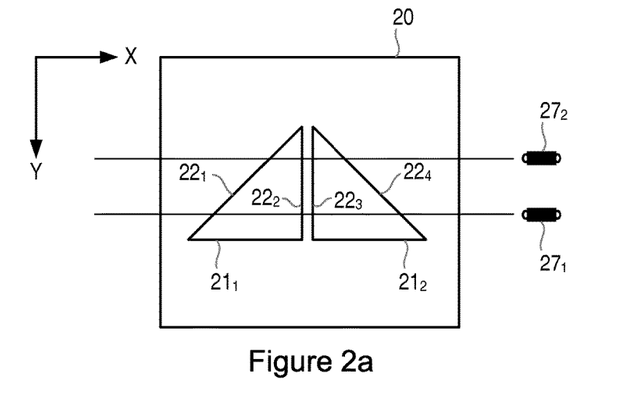
FIG. 2a shows a plan view of an example of an alignment pattern.

FIG. 2a shows a plan view of an example of an alignment pattern. In the example of FIG. 2a the alignment pattern comprises at least one triangular alignment pattern 21 on a build material 20. In this particular example first and second triangular alignment patterns $21_1$ and $21_2$ are provided. It is noted, however, that any number of triangular patterns may be used. Furthermore, it is noted that any shape of alignment pattern may be used.

In the example of FIG. 2a, a predetermined alignment pattern comprises at least first and second reference lines that traverse a scan axis X of an agent distributor (for example first and second reference lines $22_1$ and $22_2$ for the first triangular alignment pattern $21_1$, and first and second reference lines $22_3$ and $22_4$ for the second triangular alignment pattern $21_2$). The first and second reference lines $22_1/22_2$ and $22_3/22_4$ relate to the sides of the triangular alignment pattern that transverse the scan axis X. The first and second reference lines $22_1$ and $22_2$ of the predetermined alignment pattern $21_1$ have a known angular relationship with respect to each other. In a similar manner the first and second reference lines $22_3$ and $22_4$ of the predetermined alignment pattern $21_2$ have a known angular relationship with respect to each other. Thus, in one example, the predetermined alignment pattern comprises at least one triangular alignment pattern, wherein the first and second reference lines form first and second sides of the triangular alignment pattern, and wherein a third side of the triangular alignment pattern is substantially parallel to the scan axis X. As noted above, an example may use any pattern for alignment, with the pattern having any orientation. Since a predetermined alignment pattern has a known pattern and orientation, in an example this enables non-alignment to be detected by a change in the pattern or a change in the orientation, for example when a detected alignment pattern is compared with a predetermined alignment pattern, for example using height profile information.

In the example of FIG. 2a the alignment pattern comprises at least one right angled isosceles triangular alignment pattern. In the example of FIG. 2a, the alignment pattern comprises a right angled isosceles triangle where the other internal angles are each 45°.

Figure 2B:
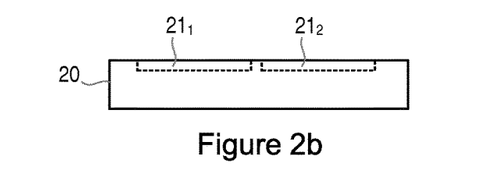
Figure 2C:
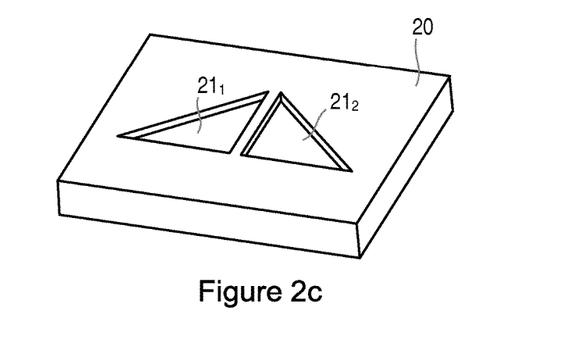

FIG. 2b is a side view showing how the triangular alignment patterns $21_1$ and $21_2$ contract after a heating operation. This is illustrated further in the perspective view of FIG. 2c. The contraction of the build material 20 (after coalescence with a coalescing agent), in an area where a predetermined alignment pattern is formed by the coalescing agent, may be used as the basis for detection of the alignment pattern, for example using height sensors $27_1$ and $27_2$ to determine a height profile, as will be explained further below.

Figure 2D:
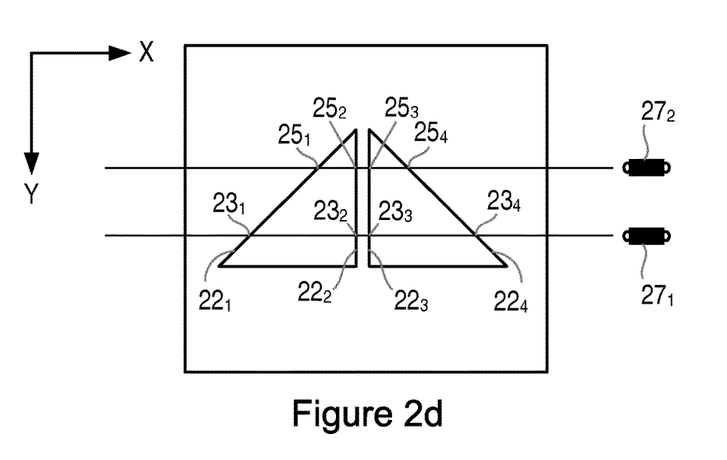

Referring to FIG. 2d, in one example an agent distributor comprises at least first and second height sensors $27_1$ and $27_2$ spaced apart from one another on an axis other than the scan axis X. In the example of FIG. 2d the first and second height sensors $27_1$ and $27_2$ are arranged along an axis Y which is substantially orthogonal to the scan axis X.

It is noted that the first and second height sensors $27_1$ and $27_2$ do not necessarily need to be aligned orthogonal to the scan axis X, and may be aligned, for example, on any axis which traverses the scan axis X. For example the first and second height sensors $27_1$ and $27_2$ may be spaced apart along any path in the general direction of the Y axis. In an example the relative positions of the first and second height sensors $27_1$ and $27_2$ in the X and Y directions are known in order to perform alignment operations. For example, the relative positions of the first and second height sensors $27_1$ and $27_2$ in the X and Y directions may be determined in advance, for example during production when an agent distributor(s) and the height sensor $27_1$ and $27_2$ (or a carriage and height sensors) are assembled.

According to an example, a method comprises scanning an agent distributor along the scan axis X, and using height information to detect the position along the scan axis of first and second reference points on each of the first and second reference lines, and comparing the positional relationship of the reference points with corresponding reference points on the predetermined alignment pattern to determine any change in angular relationship between the first and second reference lines. In this way, the height information can be used to check if the angular displacement between the first and second lines has deviated from the original alignment pattern.

In the example of FIG. 2d, the first and second height sensors $27_1$ and $27_2$ scan the height profile in the direction of the scan axis X. In one example the height sensors collect values of height Z (i.e. distance from the height sensor to the surface of the build material being scanned) and a position along the scan axis X, for each of a plurality of points along the scan axis X. Thus, in such an example, for each of a plurality of points along the scan axis X, height information Z and position information along the scan axis X is determined or gathered for use in comparing a positional relationship. It is noted that, in an example, the Y position of each sensor is accurate by its calibration, for example in a production line.

In this way it is possible to determine a plurality of reference points on the predetermined alignment pattern. For example, the sensor $27_1$ can be used to determine reference points $23_1$, $23_2$, $23_3$ and $23_4$ from the height profile. Likewise, sensor $27_2$ can be used to determine reference points $25_1$, $25_2$, $25_3$ and $25_4$ from the height profile. Thus, at least two reference points are determined for each of first and second reference lines that traverse the scan axis (the reference points being intersection points on the reference lines). In this example two reference points are determined for each side of each triangle that traverse the scan axis X, for example reference points $23_1$ and $25_1$ for a first reference line $22_1$, and reference points $23_2$ and $25_2$ for a second reference line $22_2$ (and in a similar manner for the second triangular alignment pattern).

In one example the method comprises using the plurality of reference points to compare the angular displacement of the first and second reference lines of the detected alignment pattern with the angular displacement of the first and second reference lines of the predetermined alignment pattern. As such, the detected reference points can be used to detect if the orientation of the triangular alignment pattern(s) has changed from what is expected, and the alignment of the agent distributor then adjusted if necessary. In an example a change of angular relationship between first and second reference lines is used to detect alignment.

In one example a processing operation, for example based on Tales' theorem, may be used to determine any misalignment.

In one example the detected alignment pattern is used to adjust alignment in a direction Y which is substantially orthogonal to the scan axis X. In such an example alignment is made in the Y direction, for example to compensate when an apparatus for generating a three-dimensional object does not provide back-and-forth movement of a platform (support) which receives build material (for example a platform such as a powder bed, in an example where a build material comprises a powder).

It is noted that an agent distributor or printhead may comprise more than two sensors to provide more scan lines and hence more reference points for determining the alignment pattern, for example the relative angular relationship between the first and second reference lines. In an example, more sensors can be used to increase accuracy.

In one example a plurality of height information Z and position information X is retrieved for points along the scan axis, and this information may then be analyzed to determine the position of the plurality of reference points, for example by determining the positions where the height changes. In another example, height information may be monitored dynamically as a height sensor scans across the scan axis X, and the position information logged when a height change is detected.

Different agents may interact differently with build materials. For example, in the example of FIGS. 2a to 2d a coalescing agent causes the build material to contract in the area where the coalescing agent is distributed, thus enabling the height profile to detect a dip or indentation in an upper surface of the build material in order to detect the alignment pattern. Thus, according to one example, the agent comprises a coalescing agent, and wherein detecting a height profile comprises detecting an indentation in a layer of the build material.

Figure 3A:
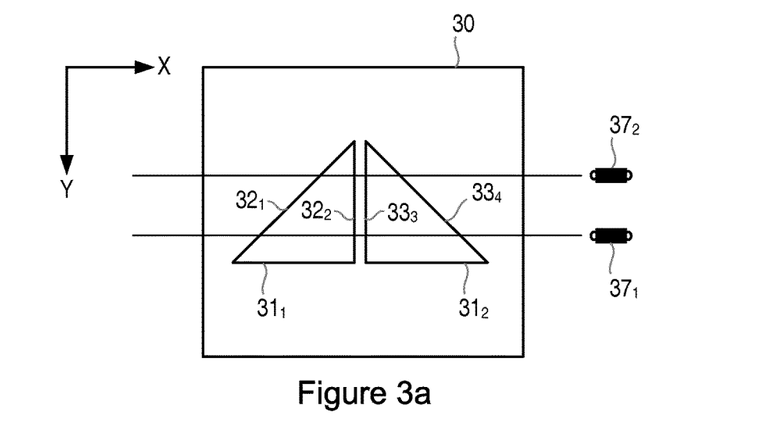
FIG. 3a shows a plan view of an example of an alignment pattern.

With a different agent, for example a coalescence modifier agent, the alignment of an agent distributor may involve detection of the inverse. For example, where a coalescence modifier agent is provided to avoid thermal conduction, a predetermined alignment pattern may be deposited, for example using the same pattern and geometry as FIG. 2a, as illustrated by FIG. 3a. In the example of FIG. 3a, a coalescence modifier agent may be deposited within the triangular regions, and a coalescing agent deposited in the areas surrounding the triangles.

Figure 3B:
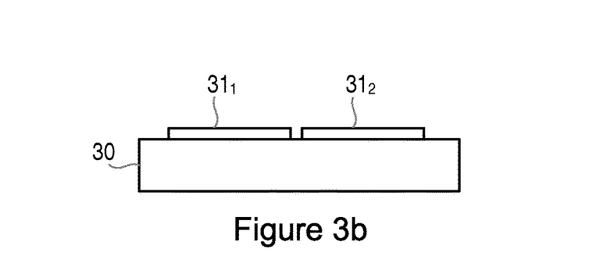
Figure 3C:
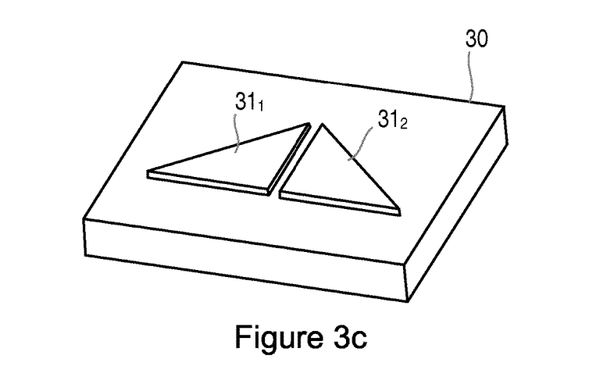

During a heating operation the area with the coalescence modifier agent (i.e. the area within a triangle, corresponding to the example of the predetermined alignment pattern) will remain at a greater height compared to the other areas having a coalescing agent deposited thereon. This is because the areas having the coalescing agent will coalesce, and result in contraction of the build material 30 in those areas that surround the triangular areas, resulting in an inverse height profile as shown in FIGS. 3b and 3c. In such an example, the procedure for alignment will be similar to that shown in FIGS. 2a to 2d, but inverted to check for a rise in height rather than a drop in height, and vice versa.

Thus, in one example the agent comprises a coalescence modifier agent, and wherein detecting a height profile comprises detecting a projection in a layer of the build material.

FIG. 3a shows a plan view of an example of an alignment pattern for use with an agent comprising a coalescence modifier agent. In the example of FIG. 3a the alignment pattern comprises at least one triangular alignment pattern 31 on a build material 20. In this particular example first and second triangular alignment patterns $31_1$ and $31_2$ are provided. As noted above, any suitable alignment pattern may be used.

Thus, in the example of FIG. 3a, a predetermined alignment pattern comprises at least first and second reference lines that traverse a scan axis X of an agent distributor (for example first and second reference lines $32_1$ and $32_2$ for the first triangular alignment pattern $31_1$, and first and second reference lines $32_3$ and $32_4$ for the second triangular alignment pattern $31_2$). The first and second reference lines $32_1/32_2$ and $32_3/32_4$ relate to the sides of the triangular alignment pattern that transverse the scan direction X). The first and second reference lines $32_1$ and $32_2$ of the predetermined alignment pattern $31_1$ have a known angular relationship with respect to each other. In a similar manner the first and second reference lines $32_3$ and $32_4$ of the predetermined alignment pattern $31_2$ have a known angular relationship with respect to each other. Thus, in one example, the predetermined alignment pattern comprises at least one triangular alignment pattern, wherein the first and second reference lines form first and second sides of the triangular alignment pattern, and wherein a third side of the triangular alignment pattern is substantially parallel to the scan axis X.

In the example of FIG. 3a the alignment pattern comprises at least one right angled isosceles triangular alignment pattern. In the example of FIG. 3a, the alignment pattern comprises a right angled isosceles triangle where the other internal angles are each 45°.

FIG. 3b is a side view showing how the build material 30 contracts after a heating operation, such that the areas corresponding to the alignment patterns $31_1$ and $31_2$ protrude above the contracted build material 30. The protruding areas corresponding to the areas where the coalescence modifier agent has been deposited. This is illustrated further in the perspective view of FIG. 3c. The protrusion of the predetermined alignment patterns $31_1$ and $31_2$ in the area where a coalescence modifier agent had been deposited are used as the basis for detection of the alignment pattern, for example using height sensors $37_1$ and $37_2$ to determine a height profile in a similar way to described above for FIGS. 2a to 2d, and as will be explained further below.

Figure 3D:
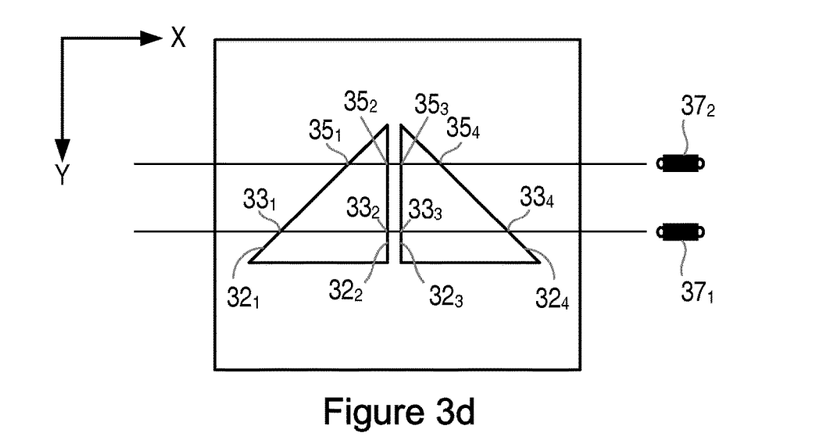

Referring to FIG. 3d, in one example an agent distributor comprises at least first and second height sensors $37_1$ and $37_2$ spaced apart from one another on an axis other than the scan axis X. In the example of FIG. 3d the first and second height sensors $37_1$ and $37_2$ are arranged along an axis Y which is substantially orthogonal to the scan axis X. It is noted that the first and second height sensors $37_1$ and $37_2$ do not necessarily need to be aligned orthogonal to the scan axis X, but may be spaced apart along a path which traverses the scan axis X.

According to an example, a method comprises scanning an agent distributor along the scan axis X, and using height information to detect the position along the scan axis of first and second reference points on each of the first and second reference lines, and comparing the positional relationship of the reference points with corresponding reference points on the predetermined alignment pattern to determine any change in angular relationship between the first and second reference lines. In this way, the height information can be used to check if the angular displacement between the first and second lines has deviated from the original alignment pattern.

In the example of FIG. 3d, the first and second height sensors $37_1$ and $37_2$ scan the height profile in the direction of the scan axis X. In one example the height sensors collect values of height Z (i.e. distance from the height sensor to the surface of the build material being scanned) and a position along the scan axis X, for each of a plurality of points along the scan axis X. Thus, in such an example, for each of a plurality of points along the scan axis X, height information Z and position information X along the scan axis X is gathered for use in comparing a positional relationship. It is noted that the Y position of each sensor is accurate by its calibration, for example in a production line.

In this way it is possible to determine a plurality of reference points on the predetermined alignment pattern. For example, the sensor $37_1$ can be used to determine reference points $33_1$, $33_2$, $33_3$ and $33_4$ from the height profile. Likewise, sensor $37_2$ can be used to determine reference points $35_1$, $35_2$, $35_3$ and $35_4$ from the height profile. In the example of FIG. 3d at least two reference points are determined for each of first and second reference lines that traverse the scan axis X. Thus, in this example two reference (or intersection) points are determined for each side of each triangle that traverse the scan axis X.

In one example, a processing operation, for example using Tales' theorem, may be used to determine any misalignment.

In the examples described herein, a height sensor for detecting a height profile may comprise an optical sensor for sensing the height, for example using a laser source or other optical mechanism. It is noted, however, that a height sensor for determining the height may comprise other forms of sensing device, such as ultrasonic sensing devices or other forms of proximity detectors.

Figure 4:
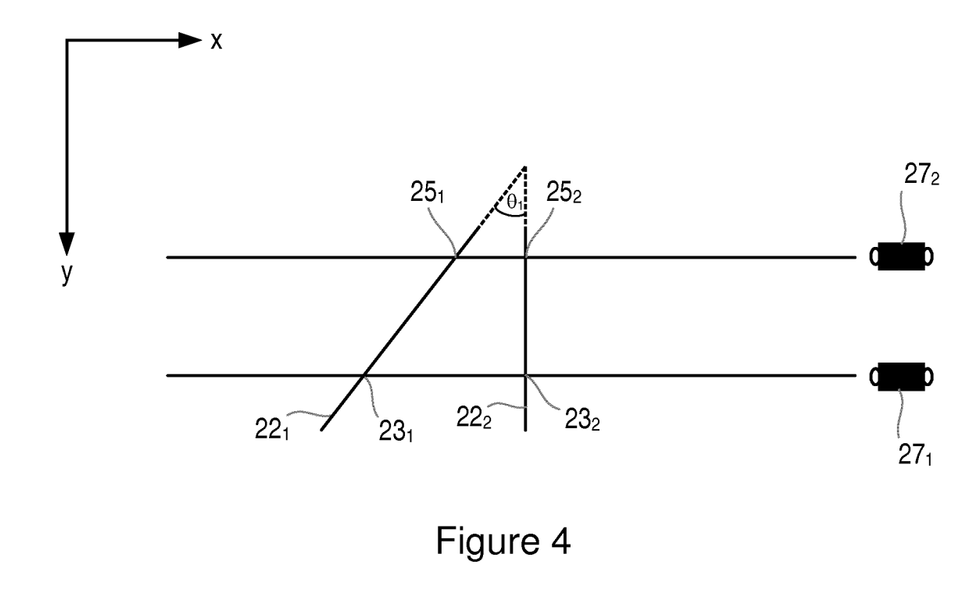
FIG. 4 shows an example of an alignment pattern.

FIG. 4 shows an example of another predetermined alignment pattern. In this example, rather than using a triangle(s) as an alignment pattern, first and second reference lines $22_1$ and $22_2$ are used, having a known angular relationship with respect to one another. In such an example a method of aligning an agent distributor, that comprises at least first and second height sensors $27_1$, $27_2$ for example, may comprise scanning the agent distributor along a scan axis X, and using height information to detect the position along the scan axis of first and second reference points $23_1/25_1$, $23_2/25_2$ on each of first and second reference lines $22_1$ and $22_2$, respectively. The positional relationship of the reference points may then be compared with corresponding reference points on the predetermined alignment pattern to determine any change in angular relationship $\theta_1$ between the first and second reference lines $22_1$ and $22_2$.

In an apparatus for generating a three-dimensional object, agent distributors for depositing agents such as coalescing agents or coalescence modifier agents can be aligned using any one of the examples described herein, and therefore provide a more accurate printing process. In an example, the alignment method does not rely on back and forth movement of a support bed, and thus such an example can perform alignment in a Y axis without back and forth movement of a support bed.

As described in the examples above, an alignment procedure may consist in creating a suitable alignment profile that is formed in a similar manner to a build layer, whereby an agent is deposited on a layer of build material and melted. Then, due to the contraction when the build material (e.g. powder) and agent coalesce or melt, the height profile that appears in the build material (e.g. on the powder bed) can be analyzed and used to align an agent distributor or printhead.

In one example an agent distributor can scan the height profile in a scan axis X, and save the values of distance Z (height) and position X during the whole scanning. The Y position of each sensor is accurate by its calibration, for example in the production line. In one example the agent distributors (e.g. printheads) are aligned separately according to the type of agent being distributed by that agent distributor.

In one example a predetermined alignment pattern comprises a series of triangles, for example triangles having a 90° angle and two angles of 45°. By scanning in the scan direction X in two different positions spaced along an axis Y of the same edge of a triangle (i.e. the scan of first and second sensors at these two positions), in one example the deviation of the edge angle with respect to the original one (45°) can be calculated, for example using Tales' theorem. Then, alignment can be made in the Y direction of the agent distributor using this deviation value.

In one example, an apparatus for generating a three-dimensional object may perform an alignment procedure as described in any of the examples above, prior to a three-dimensional object being generated.

Figure 5:
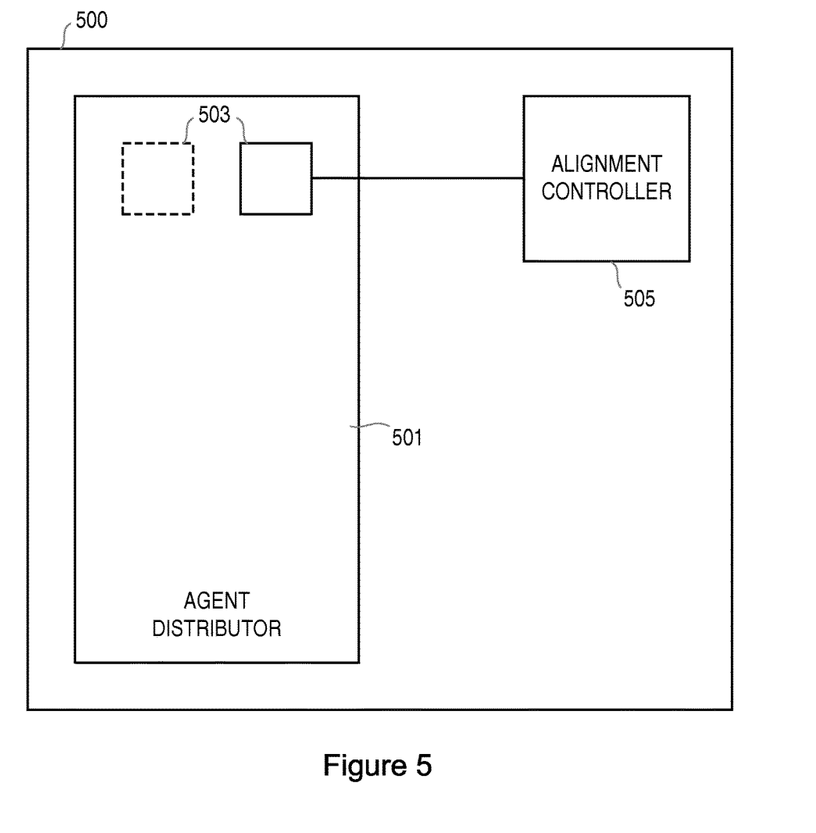
FIG. 5 shows an example of an apparatus for generating a three dimensional object.

FIG. 5 shows an example of an apparatus 500 for generating a three-dimensional object. The apparatus comprises an agent distributor 501 to distribute a predetermined alignment pattern on a build material. The predetermined alignment pattern may comprise one or more triangles as described above, or any other pattern. The apparatus 500 comprises at least one height sensor 503 to detect the alignment pattern. The apparatus 500 comprises an alignment controller 505 to control alignment of the agent distributor based on the detected alignment pattern.

In the examples described herein, performing an alignment control operation may comprise any form of alignment operation or procedure, including for example, changing a position or orientation of an agent distributor (e.g. a form of physical alignment or adjustment), or a change to how an agent or build material is deposited, for example a change to firing data and/or timing, or adjusting drop size or weight (e.g. a form of logical or soft alignment or adjustment).

In one example the at least one height sensor 503 detects a change in height in the surface of the build material at a plurality of reference points along a scan axis. In one example the alignment controller 505 uses the plurality of reference points to compare the detected alignment pattern with the predetermined alignment pattern.

It is noted that an agent distributor or printhead, in an example, may comprise a length which is shorter that the width of a printing area, such that an agent distributor or printhead does not span the whole width of the printing area. In such examples, an agent distributor(s) or printhead(s) may be mounted on a moveable carriage to enable them to move bi-directionally across a page width axis, i.e. scan in a scan direction X. This enables selective delivery of an agent, for example a coalescing agent and a coalescence modifier agent, across the whole width of a printing area, either in a single pass or multiple passes. In other examples the agent distributor(s) may be fixed, and the support member may move relative to the agent distributor(s).

It is noted that, according to another example, an agent distributor or printhead may comprise a length that enables them to span the whole width of a printing area in a so-called page-wide array configuration. In one example this may be achieved through a suitable arrangement of multiple agent distributors or printheads.

Figure 6:
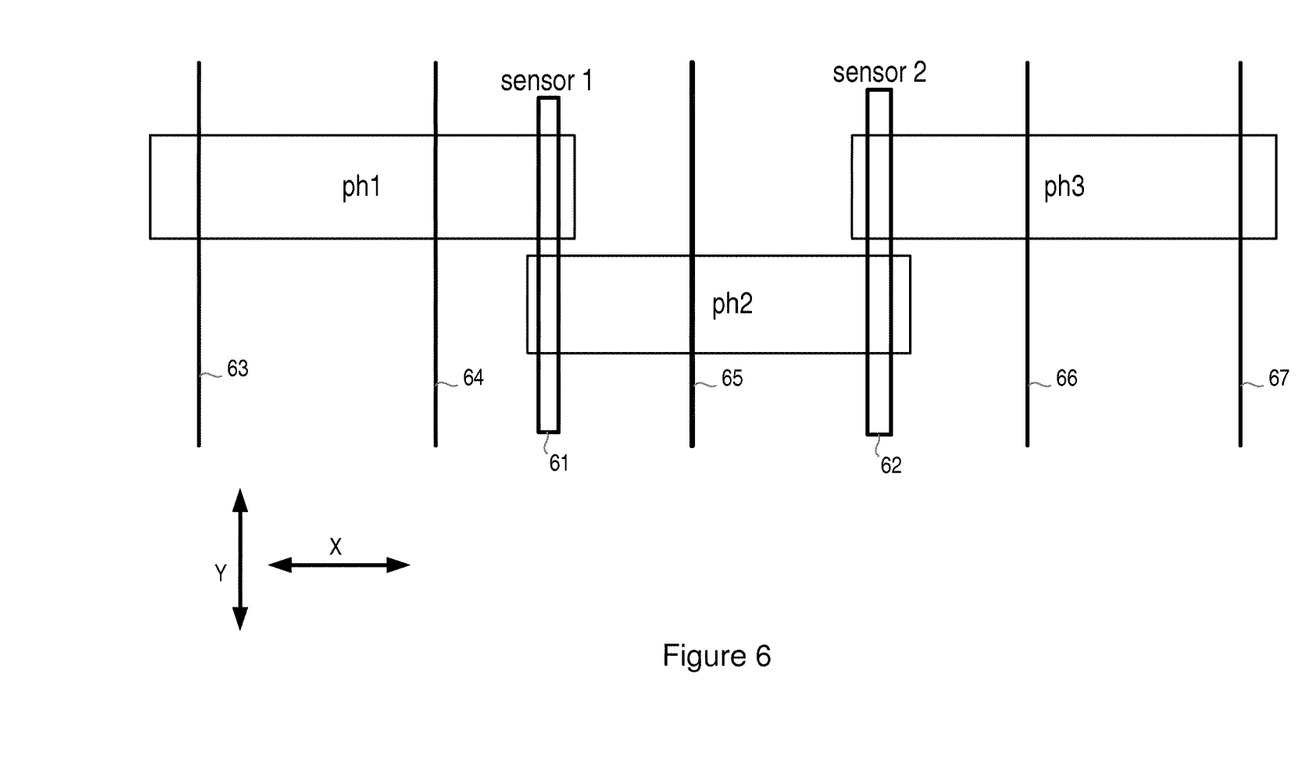
FIG. 6 shows another example of an apparatus for generating a three dimensional object.

FIG. 6 shows an example of a so-called page-wide array configuration (showing staggered agent distributors, for example staggered printheads, ph1, ph2, ph3). In such an example a first sensor, sensor 1, may be provided to scan a height profile along a first axis 61, with a second sensor, sensor 2, provided to scan a height profile along a second axis 62. In such an example having staggered agent distributors or printheads, the first and second height profiles may be determined along an axis that passes through an area where the first and second agent distributors overlap. The height profiles along the first and second axes 61, 62 may be used to detect a predetermined alignment pattern, for example triangular alignment patterns as disclosed in the examples above, or some other form of alignment pattern. In another example, one or more additional sensors may be used to detect a height profile along other axes, for example the axes labelled 63, 65, 66 and 67 in FIG. 6. Since the agent distributors in FIG. 6 do not move in a direction X (sometimes referred to as a page-width direction), the agent distributors of FIG. 6 print an alignment pattern, e.g. triangles, by moving in a direction Y. In one example the first sensor is positioned on the same structure as the printheads (not shown), somewhere along the axis 61, with the second sensor positioned on the same structure as the printheads, somewhere along the axis 62. When a scan is performed in the direction Y to detect the predetermined alignment pattern, the sensor 1 will detect the alignment pattern from the height information along the path 61, while sensor 2 detects the height information along the path 62 (and similarly for any additional sensors, e.g. along paths 63, 64, 65, 66 and 67). In such an example, first and second reference lines of an alignment pattern may be arranged to traverse the paths 61 and 62 of the respective first and second sensors (and the paths 63, 64, 65, 66 and 67 where more sensors are used), whereby the first and second reference lines having a known angular relationship. In such an example alignment information can be determined in a similar way to the examples described above.

Thus, in the example of a page-wide array configuration of FIG. 6, the first and second height sensors are arranged along an axis X, corresponding to an axis which spans the page width in the direction illustrated as X.

In another example a single agent distributor or printhead having an array of nozzles having a length to enable them to span the width of the printing area may be used. In an example relating to a page-wide array configuration, a carriage may be provided for enabling a height sensor to scan the alignment pattern(s). In an example where a carriage is provided for enabling a height sensor to scan an alignment pattern(s), first and second sensors are positioned relative to each other in a direction Y. In another example of a page-wide array configuration, a plurality of height sensors may be distributed along a width of the apparatus, or along the effective scan axis.

From the description above it can be seen that, in one example, the method comprises creating a suitable alignment pattern by depositing an agent in a layer of build material, that is heated and melted. Then, due to the contraction of the build material when it is melted, the height profile that appears on the powder bed is analysed and used to align a printhead.

Although an alignment pattern is shown in an example as being a solid triangular shape, it is noted that the alignment pattern may take other shapes or patterns, for example a pattern which comprises a triangular border, or a series of lines having known angular relationships, or part of an object being built.

From the description above it can be seen that, according to an example, the alignment of an agent distributor or printhead, and calibration of a layer, is carried out using the actual output of the apparatus for generating a three dimensional object (for example using the output of the apparatus that deposits a layer of build material and which selectively deposits an agent onto the build material). According to an example, no intervention by an operator is required during an alignment operation, such as visual inspection by an operator.

Although an example has been described using a laser sensor for determining height, it is noted that other sensors or mechanisms may be used, including measuring devices which allow real-time height measurements for 3D printers.

In one example, alignment does not rely on forward and backward movement in the X and Y directions of a support bed, as is possible in 2D printers, and which may not be possible in an example of a 3D printer. Furthermore, in an example an alignment operation does not rely on having a stable substrate. Instead, in an example an alignment operation is possible using movement in the scan direction X.

In an example where the first and second sensors are located on the same agent distributor, and in a Y direction, this enables first and second scans to be conducted simultaneously, and in parallel. Since the scans are in parallel, this allows Thales' theorem to be used to detect misalignment.

According to one example there is provided a method of aligning an agent distributor in an apparatus for generating a three-dimensional object, wherein a change in height in a layer of build material, caused by interaction between the build material and an agent used to form an alignment pattern, is used to detect an alignment pattern.

In one example at least first and second reference lines are provided per agent distributor to be aligned. In another example at least first and second reference lines are provided for a set of agent distributors, whereby the set of agent distributors are in a known positional relationship with respect to each other.

According to one example, there is provided a method of aligning an agent distributor in an apparatus for generating a three-dimensional object, wherein the method comprises detecting an alignment pattern using height information detected from a surface of a build material, wherein the height profile is caused by interaction of an agent with the build material.

According to one example, there is provided a method of aligning an agent distributor in an apparatus for generating a three-dimensional object, wherein the method comprises detecting an alignment pattern using color or contrast information detected from a surface of a build material, wherein the color or contrast information is caused by interaction of an agent with the build material.

In an example an agent distributor deposits or prints a known alignment pattern having a predetermined shape onto a build material, and then after the agent and build material have coalesced, scans along a scan axis, and from a height profile determines a plurality of reference points from the scanned alignment pattern. The position of the plurality of reference points is compared with what should be expected from the known alignment pattern, to determine whether any adjustment is required to the alignment pattern, and if necessary any corrective action taken.

In an example a change of height, due to interaction of the build material and an agent, for example a coalescing agent or a coalescence modifier agent, is used to detect a predetermined alignment pattern, or detect a plurality of known reference points.

In one example there is provided an apparatus for generating a three-dimensional object, the apparatus comprising at least one height sensor to detect an alignment pattern in a surface of a build material, wherein the alignment pattern is formed by contraction of the build material following interaction of the build material with an agent.

In one example there is provided an apparatus for performing an alignment calibration. The apparatus comprises an agent distributor for depositing an alignment pattern on a layer of build material, at least first and second height sensors to detect the alignment pattern in a surface of the build material, and an alignment controller to determine a misalignment based on the detected alignment pattern, and to correct for any misalignment.

It should be noted that the above-mentioned description illustrates rather than limits the examples described herein, and that those skilled in the art will be able to design many alternative examples without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method of aligning an agent distributor in an apparatus for generating a three-dimensional object, the method comprising:

the agent distributor selectively depositing a coalescing agent on a layer of build material to form a predetermined alignment pattern; wherein the coalescing agent causes an indentation in a surface of the build material, and detecting the alignment pattern from a height difference in the surface of the build material between portions of the build material on which the agent has been deposited and portions of the build material on which the agent has not been deposited; and performing an alignment operation using the detected alignment pattern.

2. The method as claimed in claim 1, wherein detecting the alignment pattern comprises detecting a change in height in the surface of the build material at a plurality of reference points along a scan axis, wherein the plurality of reference points are used to compare the detected alignment pattern with the predetermined alignment pattern.

3. The method as claimed in claim 2, wherein the predetermined alignment pattern comprises at least first and second reference lines that traverse a scan axis (X) of the agent distributor, the first and second reference lines having a known angular relationship ($\theta 1$) with respect to each other.

4. The method as claimed in claim 3, wherein an agent distributor comprises at least first and second height sensors spaced apart from one another on an axis other than the scan axis (X), the method comprising:

scanning the agent distributor along the scan axis (X);

using height information to detect a position along the scan axis of first and second reference points on each of the first and second reference lines; and comparing a positional relationship of the reference points with corresponding reference points on the predetermined alignment pattern to determine any change in angular relationship between the first and second reference lines.

5. The method as claimed in claim 4, wherein comparing a positional relationship comprises using the plurality of reference points to compare the angular displacement of the first and second reference lines with the angular displacement of the predetermined alignment pattern.

6. The method as claimed in claim 4, wherein for each of the plurality of points along the scan axis (X), height information (Z) and position information along the scan axis (X) is determined for use in comparing the positional relationship.

7. The method as claimed in claim 3, wherein the predetermined alignment pattern comprises at least one solid triangle, and wherein the first and second reference lines form first and second sides of the solid triangle.

8. The method as claimed in claim 7, wherein the solid triangle comprises at least one right angled isosceles triangle.

9. The method as claimed in claim 8, wherein the detected alignment pattern is used to adjust alignment in a direction (Y) which is substantially orthogonal to the scan axis (X).

10. The method as claimed in claim 1, wherein the detected alignment pattern is used to adjust an alignment of at least one agent distributor.

11. The method as claimed in claim 1, wherein detecting the height difference comprises optically sensing height.

* * * * *

UNITED STATES PATENT AND TRADEMARK OFFICE
CERTIFICATE OF CORRECTION

PATENT NO. : 10,399,271 B2  
APPLICATION NO. : 15/515333  
DATED : September 3, 2019  
INVENTOR(S) : Isabel Sanz Ananos et al.

Page 1 of 1

It is certified that error appears in the above-identified patent and that said Letters Patent is hereby corrected as shown below:

In the Claims

In Column 12, Line 11, in Claim 5, delete "a" and insert -- the --, therefor.

Signed and Sealed this  
Nineteenth Day of November, 2019

Andrei Iancu  
*Director of the United States Patent and Trademark Office*